Patented Aug. 30, 1949

2,480,683

UNITED STATES PATENT OFFICE 2,480,683

REDUCTION OF COMPOUNDS CONTAINING AN ACTIVE METHYLENE GROUP

Eric T. Stiller, Philadelphia, Pa., assignor to Merck & Co., Inc., Rahway, N. J., a corporation of New Jersey No Drawing. Application December 24, 1942, Serial No. 470,096, which is a division of application Serial No. 309,574, December 16, 1939. Divided and this application October 29, 1946, Serial No. 706,522

6 Claims. (Cl. 260—471)

This invention relates to compounds containing an active methylene group, derivatives of such compounds, and processes of preparing the same.

This application is a division of my copending application Serial No. 470,096, filed December 24, 1942 which matured into Patent No. 2,422,598, is a division of my copending application Serial No. 309,574, filed December 16, 1939, which matured into Patent No. 2,306,765, issued December 29, 1942.

I have discovered that the methylene group of acetylacetone, substituted acetylacetone, malonic esters, cyanoacetic esters, etc., will react with compounds which contain a double bond oxygen, or which are capable of forming a double bond oxygen, such as ortho esters and nitrous acid, to introduce an alkoxymethylene or an isonitroso group into the molecule. The alkoxymethylene group thus introduced may be reacted with ammonia, an amine or an amide having at least one hydrogen, to form the corresponding aminomethylene or amidomethylene group.

I have also discovered that the aminomethylene, amidomethylene and isonitroso (the latter in the presence of an agent which can stabilize the amino group, such as an acid anhydride, an acid, etc.) derivatives may be hydrogenated to form the corresponding aminomethyl, amidomethyl, amine salts of acylamino derivatives. These new compounds may be illustrated by the general formula:

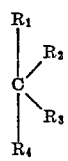

wherein $R_1$ is a member selected from the group consisting of alkoxyacyl, acyl, carbalkoxy, and alkoxyalkyl; $R_2$ is selected from the group consisting of alkoxy, and hydrogen; $R_3$ is selected from the group consisting of alkoxy, acylaminoalkyl and acylamino, and wherein $R_2$ and $R_3$ together may represent a member selected from the group consisting of alkoxymethylene, aminomethylene, acylaminomethylene, alkoxyalkylalkoxymethylene, imino, alkoxyalkylacylaminomethylene, and isonitroso; $R_4$ is a member selected from the group consisting of acyl, alkoxyacyl, alkoxy, and cyanogen.

The above compounds may be obtained according to the following:

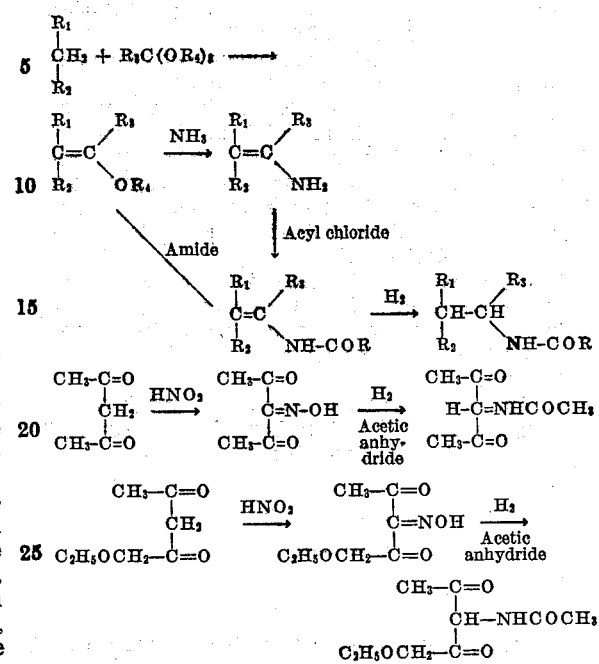

The compounds of the present invention are particularly useful as intermediates for the production of substituted pyridine and pyridone compounds, for example, by condensing them with a malonic acid derivative such as cyanoacetamide, carbamoacetic esters, etc.

The following examples illustrate methods of carrying out the present invention, but it is to be understood that these examples are given by way of illustration and not of limitation.

*Example 1*

2 grams of ethyl-α-benzoylaminomethyleneacetoacetate are dissolved in 150 cc. of ethyl alcohol and hydrogenated in the presence of 0.1 gram of a platinum catalyst. The catalyst is removed by filtration and the solvent removed by evaporation under reduced pressure. The ethyl-α-benzoylaminomethyl acetoacetate is a faintly yellow oil which crystallizes on standing. After recrystallization from ether-petroleum ether, it is obtained as colorless needles, melting point 56° C. Yield 1.90 grams.

Example 2

26 grams of ethyl-gamma-ethoxy acetoacetate, 22.1 grams of ethyl orthoformate, and 30.5 grams of acetic anhydride are refluxed for 40 minutes. The reaction mixture is then distilled until the temperature reaches 122° C. The residue is distilled through a fractionating column at 8 mm. up to 165° C. and then refractionated at 5 mm. The fraction boiling at 146–52° C. at 5 mm. crystallizes on standing at 0° C. After separating from a little oily material and recrystallizing from petroleum ether, the ethyl-α-ethoxymethylene-gamma-ethoxy acetoacetate is obtained as colorless fine long needles, melting point 57–58° C. The oily material on cooling gives further crystals. Total yield 19.7 grams.

12.8 grams of ethyl-α-ethoxymethylene-gamma-ethoxy acetoacetate are mixed with 6.73 grams benzamide, and the mixture heated at 150° C. for 50 minutes. After cooling, alcohol is added and the product is obtained as pale brown plates on standing at 0° C. The yield of ethyl-α-benzoylaminomethylene-gamma - ethoxy acetoacetate is 8 grams. On recrystallization from alcohol it melts at 96–98° C.

2 grams of ethyl-α-benzoylaminomethylene-gamma-ethoxy acetoacetate are dissolved in 150 cc. alcohol and hydrogenated in the presence of 0.1 gram of a platinum catalyst. The catalyst is removed by filtration and the solvent removed by concentration under reduced pressure. The ethyl-α-benzoylaminomethyl-gamma-ethoxy acetoacetate obtained is distilled and obtained as an almost colorless oil.

Modifications may be made in carrying out the present invention without departing from the spirit and scope thereof, and I am to be limited only by the appended claims.

I claim:

1. The process that comprises catalytically hydrogenating the olefinic bond in a compound represented by the formula:

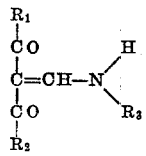

wherein $R_1$ is an alkoxy group, $R_2$ is a substituent selected from the class consisting of alkyl and alkoxyalkyl and $R_3$ is an aromatic acyl group.

2. A composition of matter represented by the formula:

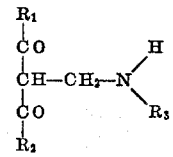

wherein $R_1$ is an alkoxy group, $R_2$ is a substituent selected from the class consisting of alkyl and alkoxyalkyl and $R_3$ is an aromatic acyl group.

3. The process that comprises catalytically hydrogenating ethyl-α-benzoylaminomethylene acetoacetate to produce ethyl-α-benzoylaminomethyl acetoacetate.

4. The process that comprises catalytically hydrogenating ethyl-α-benzoylaminomethylene-gamma-ethoxy acetoacetate to produce ethyl-α-benzoylaminomethyl-gamma-ethoxy acetoacetate.

5. Ethyl-α-benzoylaminomethyl acetoacetate.

6. Ethyl-α-benzoylaminomethyl-gamma-ethoxy acetoacetate.

ERIC T. STILLER.

REFERENCES CITED

The following references are of record in the file of this patent:

UNITED STATES PATENTS

| Number | Name | Date |
|---|---|---|
| 1,077,442 | Thron | Nov. 4, 1913 |
| 1,277,708 | Ellis | Sept. 3, 1918 |
| 1,429,922 | Bockmuhl et al. | Sept. 26, 1922 |
| 2,184,009 | Dickey | Dec. 19, 1939 |
| 2,186,630 | Dickey | Jan. 9, 1940 |

FOREIGN PATENTS

| Number | Country | Date |
|---|---|---|
| 3,752 | Great Britain | 1910 |
| 104,334 | Switzerland | May 1, 1924 |

OTHER REFERENCES

Claissen, "Leibig's Annalen," vol. 297 (1897), pp. 1 to 21, 29 to 33, 57 to 69.

Scheiber, "Ber. Deut. Chem.," vol. 46 (1913), pp. 1100–1105.

Scheiber, "Ber. Deut. Chem.," vol. 46 (1913), pp. 2412–2416.

Mannich et al., "Ber. Deut. Chem.," vol. 57 (1924), pp. 1109 and 1110.

Mannich et al., "Liebigs Annalen," vol. 453 (1927), pp. 179 and 185.